(12) United States Patent
Weinowski et al.

(10) Patent No.: US 7,131,320 B2
(45) Date of Patent: Nov. 7, 2006

(54) METHOD AND DEVICE FOR ARTIFICIALLY AGEING A CATALYTIC CONVERTER

(75) Inventors: Rolf Weinowski, Stolberg (DE); Sascha Werner, Herzogerath (DE); Christof Schernus, Nideggen (DE)

(73) Assignee: FEV Motorentechnik GmbH, Aachen (DE)

( * ) Notice: Subject to any disclaimer, the term of this patent is extended or adjusted under 35 U.S.C. 154(b) by 19 days.

(21) Appl. No.: 10/520,719

(22) PCT Filed: Jul. 14, 2003

(86) PCT No.: PCT/EP03/07570

§ 371 (c)(1),
(2), (4) Date: Feb. 7, 2005

(87) PCT Pub. No.: WO2004/007922

PCT Pub. Date: Jan. 22, 2004

(65) Prior Publication Data

US 2005/0204804 A1    Sep. 22, 2005

(30) Foreign Application Priority Data

Jul. 16, 2002    (DE)    ............................. 102 32 120

(51) Int. Cl.
*G01M 19/00*    (2006.01)

(52) U.S. Cl. .................. 73/118.1; 73/865.6; 73/23.31; 73/23.32

(58) Field of Classification Search ............... 73/118.1, 73/865.6, 23.31, 23.32
See application file for complete search history.

(56) References Cited

U.S. PATENT DOCUMENTS

| 5,011,592 | A | * | 4/1991 | Owen et al. | ................. 208/113 |
| 5,396,794 | A | * | 3/1995 | Nichols | .................... 73/118.1 |
| 5,998,210 | A | * | 12/1999 | Hepburn et al. | ............... 436/37 |
| 6,151,888 | A | | 11/2000 | Schneider et al. | |
| 6,378,359 | B1 | * | 4/2002 | Dobson et al. | ............ 73/118.1 |
| 6,983,645 | B1 | * | 1/2006 | Webb et al. | ................ 73/118.1 |
| 2001/0054281 | A1 | | 12/2001 | Adams et al. | |

FOREIGN PATENT DOCUMENTS

| EP | 1114921 | 7/2001 |
| GB | 2356826 | 6/2001 |
| WO | WO 2003/007922 | 1/2003 |
| WO | WO03014620 | 2/2003 |

* cited by examiner

*Primary Examiner*—Michael Cygan
(74) *Attorney, Agent, or Firm*—Townsend and Townsend and Crew LLP (57) ABSTRACT

The invention relates to a method for artificially ageing a catalyst device for use on a catalyst test bench for converting exhaust gases comprising at least one constituent from the group consisting of C-, HC- and NOx-containing constituents, in which method hot ageing gas which comprises at least one constituent from the group consisting of C-, HC- and NOx-containing constituents is allowed to flow through the catalyst device, and to a corresponding apparatus.

36 Claims, 4 Drawing Sheets

METHOD AND DEVICE FOR ARTIFICIALLY AGEING A CATALYTIC CONVERTER

BACKGROUND OF THE INVENTION

1. Field of the Invention

The invention relates to a method for artificially ageing a catalyst device in accordance with the preamble of claim 1 and to an apparatus which is suitable for carrying out the method.

2. Background

In the past, the US state of California has made a name for itself by imposing early and strict emission legislation for gasoline vehicles. This legislation means that it is necessary to develop exhaust-gas aftertreatment systems which have a service life of more than 100 000 miles. In the European Union, the legislature, using exhaust classification Euro 3, stipulates a service life of 80 000 km, and then from vehicle models from 2005 onward, by introducing exhaust classification Euro 4, a service life of 100 000 km.

To reduce traffic-produced air pollution, in 1988 the California Air Resources Board (CARB) introduced stricter emission limits for all gasoline vehicles in California with OBD (On-Board Diagnosis). In addition to these stricter regulations, all components of relevance in the exhaust gas had to be subject to continuous monitoring by the electronic control units available. The European Union introduced similar legislation for all gasoline vehicles from model year 2001 onward. The exhaust classifications distinguish between the limit values for the emissions and the on-board diagnosis. The limit values for the OBD are provided with a fixed deterioration factor by the CARB and are intended to reflect the performance of an aged component. Therefore, when this exhaust limit is exceeded, the driver must be made aware that a component which is of relevance to emissions is defective by means of an optical system.

This monitoring of all on-board diagnoses must be certified during homologation (approval) before the legislature using correspondingly aged components in order to demonstrate the fault detection. Furthermore, it is necessary to provide evidence that the emission guidelines as prescribed by the legislature are satisfied in accordance with the predetermined durability.

In addition to type certification, the legislature in the field, especially in California and the USA, is monitoring automobile manufacturers to establish whether the prescribed regulations are being complied with and whether the statutory regulations can be extended further. For example, the LEVII legislation, which applies from models dated 2004 onward, primarily provides for stricter regulation of the NOx emissions. This applies in particular to OBD, since currently only the hydrocarbon (HC) emissions are regulated, which means that the automobile manufacturer will also only use diagnosis technology to monitor a deterioration in the conversion of hydrocarbons in the exhaust gas. Since experience and field tests in recent years have established that nitrogen oxide emissions do not have comparable ageing properties to hydrocarbon emissions, from models dated 2004 onward excessive NOx emissions also have to be monitored in addition to the hydrocarbon emissions.

For example, with the introduction of the LEVII legislation in the USA, the emissions from the catalyst to be monitored must not exceed the emission limit to be applied by more than 1.75 times with regard to either the methane-free hydrocarbon emissions or the nitrogen oxide emissions, and the conversion rate of the aged catalyst must not drop below 50% either for the methane-free hydrocarbon emissions or for the nitrogen oxide emissions.

Furthermore, the LEVII legislation requires the ageing of entire exhaust systems for manufacturers which do not provide for cylinders to be shut down in the event of detected misfires above the levels of misfires which damage the catalyst.

The ever-increasing demands imposed by the legislature require automobile manufacturers to invest more research into the ageing processes of components which are of relevance in terms of exhaust emissions.

The aged components represent an important constituent in the investigation of the relevance to exhaust gas during the use of each vehicle. For example, on the one hand it must be established what influence an aged component has on the emissions, and on the other hand it must be established to what extent the performance has changed compared to a new component. This information has to be correspondingly processed in the software during use.

In this context, the ageing performance of catalytic exhaust systems and the simulation of ageing states are of huge importance.

Currently, there are in principle three different artificial ageing methods for motor vehicle catalysts.

One alternative is to simulate misfires in the vehicle. The unburnt air and fuel mix is afterburnt in the catalyst and produces relatively high catalyst temperatures. However, this method of ageing has not proven to be reproducible in the past, since it has been impossible to determine a uniform cycle for ageing the different catalyst systems. Moreover, during a constant operating point it is difficult to keep the temperature in the catalyst at one level. On account of the uncontrolled combustion of the unburnt fuel in the catalyst and the associated uncontrollable temperature peaks, furthermore, the component is weakened, even to the extent of the catalyst being visually destroyed. Furthermore, this ageing method may be relatively time-consuming and cost-extensive, since it generally requires a plurality of catalysts for different tests, and also on account of the expensive use of engine test benches and the availability thereof.

A further method of catalyst ageing is the furnace or vacuum furnace ageing method. In this method, only the monolith of the catalyst is aged at a temperature of from 1000 to 1350° C. in the furnace. After the ageing, the monolith has to be passed on to the corresponding suppliers in order to be installed in the catalyst housing. The correspondingly aged component then has to be mounted in the vehicle and run in for several hundred kilometers in order to be stabilized with regard to emissions. If the emission objective is not achieved after one exhaust gas test, the ageing process has to be repeated. In general, a plurality of iterative ageing steps are required in order to obtain the desired deterioration in the conversion rate. This method can lead to considerable time delays in the OBD application process. In addition to being time-consuming, the work of dismantling and fitting the catalyst and also the stabilizing program which has to be passed through after each ageing step also involve the use of expensive resources. Furthermore, this ageing method cannot be used to age the entire exhaust system, since different loading of the component as a result of the different positions of the catalysts in the vehicle cannot be simulated using this method.

In addition to the methods mentioned above, the artificial ageing of catalysts on the engine test bench is also employed. In one specific long-term running cycle, the catalyst is subjected to extreme temperature peaks and operating states in order to accelerate ageing. In addition, the ageing can be accelerated by lambda controller interventions to set a "rich" or "lean" mix. On account of the use of an engine test bench, this method is relatively expensive and cannot be transferred to different exhaust systems. In this context, it is also possible to use a combination of a rich exhaust-gas mix with additional oxygen enrichment of the exhaust gas for more effective afterburning. However, it has been found that, on account of the temperature peaks which occur, partial melting or even complete erosion of the monolith may occur in the catalyst.

Therefore, all the methods listed are iterative ageing methods which either require a relatively high level of outlay on resources, such as for example engine test benches, or presuppose an unknown number of test carriers. A further problem is that modern catalysts are tailor-made for the individual automobile manufacturers, for example with different cell densities and/or different levels of precious metals, and therefore the ageing characteristics differ between these catalysts. Therefore, it is not currently possible to use a uniform ageing cycle which causes the exhaust gas to deteriorate to a comparable level.

SUMMARY OF THE INVENTION

Therefore, it is an object of the invention to provide a method for artificially ageing a catalyst device in accordance with the preamble of claim 1 and an apparatus suitable for this method which make it possible to standardize the artificial ageing.

This object is achieved in accordance with the combination of features of claims 1 and 28, respectively.

Accordingly, artificial ageing is performed by hot ageing gas comprising C-, HC- and/or NOx-containing constituents being passed through a catalyst device which is for use on a catalyst test bench and is suitable for the conversion of exhaust gases comprising C-, HC- and/or NOx-containing constituents.

The ageing gas is expediently generated by combustion of a C-containing fuel with combustion air, preferably by combustion in a burner or a gas turbine. Furthermore, the composition of the ageing gas can be altered by admixing additional components, in particular C-, HC- and/or NOx-containing components.

However, the ageing gas may also be generated synthetically, i.e. by being removed from gas cylinders and heated or by combustion of hydrogen and admixing of additional components, in particular C-, HC- and/or NOx-containing components.

It is expedient to use an ageing gas at a temperature of >250° C., preferably >700° C., and in particular from approximately 1000° C. to approximately 1250° C.

If the ageing gas is generated as hot exhaust gas from a combustion operation of a C-containing, liquid or gaseous fuel, it is preferable to work with a lambda setting of >1, preferably >1.5. The temperature of the ageing gas that is to be fed to the catalyst device may be varied by cooling independently of the lambda setting. The cooling can be effected in various ways, for example the intake air for combustion can be correspondingly cooled, or it is possible to use a fuel with a very high enthalpy of evaporation, for example methanol, or alternately it is possible to inject water during the combustion operation, and it is also possible for cold air or cooled gas emerging from the catalyst device to be admixed with the hot ageing gas. The latter, recirculated gas can be cooled, for example, by means of heat exchangers, by water injection, by adding cold air or the like.

The temperature of the ageing gas that is to be fed to the catalyst device can be varied by the cooling independently of the lambda setting.

The fuel which is burnt is expediently a low-sulfur fuel, which preferably contains less than 10 ppm of sulfur, in particular less than 5 ppm of sulfur, with combustion air, with ageing gas that has been standardized in this way being blown through the catalyst device at a suitable temperature of greater than approximately 700° C., preferably in the range from approximately 1000° to approximately 1250° C., by means of a hot-air blower. Chemical ageing or poisoning of the catalyst device during the ageing is avoided with a fuel having a very low sulfur content. This makes it possible to dispense with a subsequent phase of stabilizing the catalyst in the vehicle.

However, sulfur-containing fuels with sulfur contents of >50 ppm can likewise be used to generate the ageing gas, especially since at temperatures of over 980° C. the sulfur compounds contained in the ageing gas are caused to decompose by the high temperature, and consequently the catalyst device is not poisoned.

The ratio of fuel to combustion air can be varied in predetermined cycles. It is in this way possible to subject the catalyst device that is to be aged to different ageing gas compositions and ageing gas temperatures corresponding to a combined load cycle which equates in particular to mixed vehicle operation. For example, with the aid of a combination of a burner and a blower, it is possible to produce a special hot exhaust gas which is passed through the catalyst device. By adjusting the parameters of air and fuel, it is possible to subject the catalyst device to cyclical thermal loads, so that it experiences conditions similar to those in real driving operation. The air mass which is passed through corresponds to the air mass as is used, for example, in mixed vehicle fleet operation. A typical ageing cycle is in a temperature range from 1000 to 1250° C. This is correspondingly possible given synthetic production of the ageing gas.

It is also possible to use a special ageing cycle which is suitable for simulating the light-off performance (light-off temperature) of the catalyst device on the test bench.

The catalyst device may be subjected a number of times, in each case after an ageing step, to a diagnosis, in which the amplitude ratio of a post-cat sensor as a measure of the oxygen storage capacity is compared with a model, the model being matched to a relevant limit catalyst and a limit value being determined from the amplitude ratio between the current signal of the post-cat sensor compared to the modeled post-cat sensor signal, the post-cat sensor signal being taken as a measure of the oxygen storage capacity of the catalyst device.

This results in systematic ageing of catalyst devices. Specifically with a view to the availability of prototype parts during application and the associated costs, an ageing method allowing stepwise and reproducible ageing of catalyst devices represents an important contribution to reducing costs and time in the production of aged components and for complying with the LEVII legislation. It is in particular possible to restrict the NOx limits and to age entire exhaust systems.

Therefore, the ageing of the catalyst devices is carried out under conditions close to reality, therefore allowing virtually all ageing mechanisms which are known in practice. The thermal deactivation of the catalyst device leads to a reduction in the surface area of the active centers (precious metals) caused by recrystallization. Furthermore, diffusion of the precious metals may occur in the coating, with the result that the active centers are less accessible or are even no longer accessible at all, and therefore the activity of the catalyst device drops. In addition to these physical ageing mechanisms, chemical reactions also take place at the high temperature. Reactions between precious metal and washcoat and reactions within the washcoat are known. These reactions may be promoted by the exhaust-gas components, such as for example $CO_2$ and $H_2O$. In particular the ageing in atmosphere which contains water vapor, as well as the parameters oxygen content, pressure and temperature, is crucial to the ageing properties of the catalyst device.

The ageing processes in the catalyst device are additionally promoted by a combination of gas composition and gas temperature, which is raised to a level which does not damage either the monolith or the washcoat. The processes reduce the activity of the catalyst device on account of a drop in the active surface area. With the aid of this ageing method, it is now possible to carry out stepwise ageing of the catalyst device.

The ageing method can be used in particular for 3-way catalysts for motor vehicles, NOx catalysts, oxidation catalysts, reformers for reducing agents and for fuel cells.

DESCRIPTION OF THE SPECIFIC EMBODIMENTS

Figure 1:
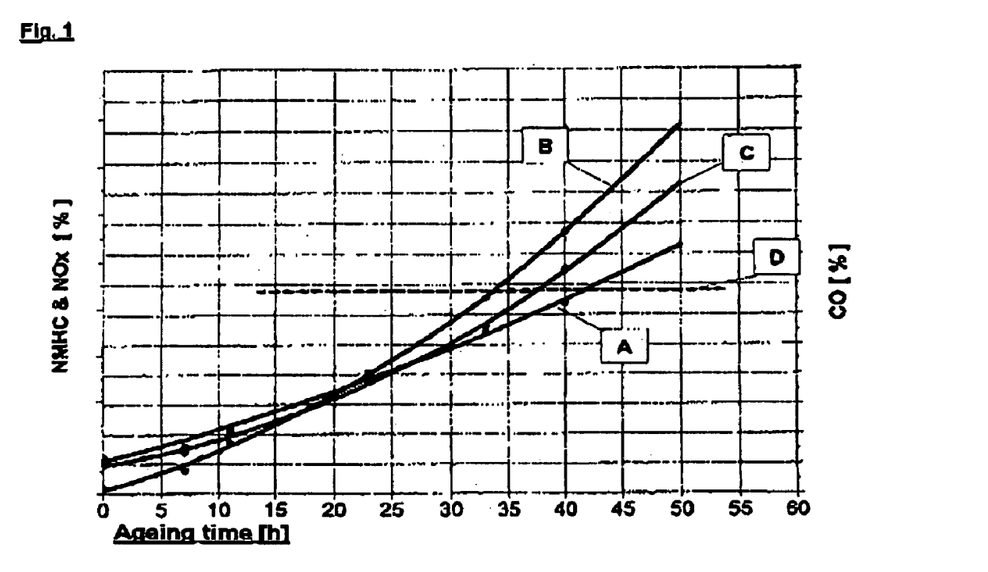
FIG. 1 is a graph illustrating an emission curve during catalyst ageing according to the invention.

FIG. 1 plots the emission curve during catalyst ageing according to the invention against time [h], with curve A representing the CO emissions [%], curve B representing the NOx emissions [%] and curve C representing the hydrocarbon emissions (without methane) [%]. Dashed curve D represents the limit value for hydrocarbon emissions.

Figure 2:
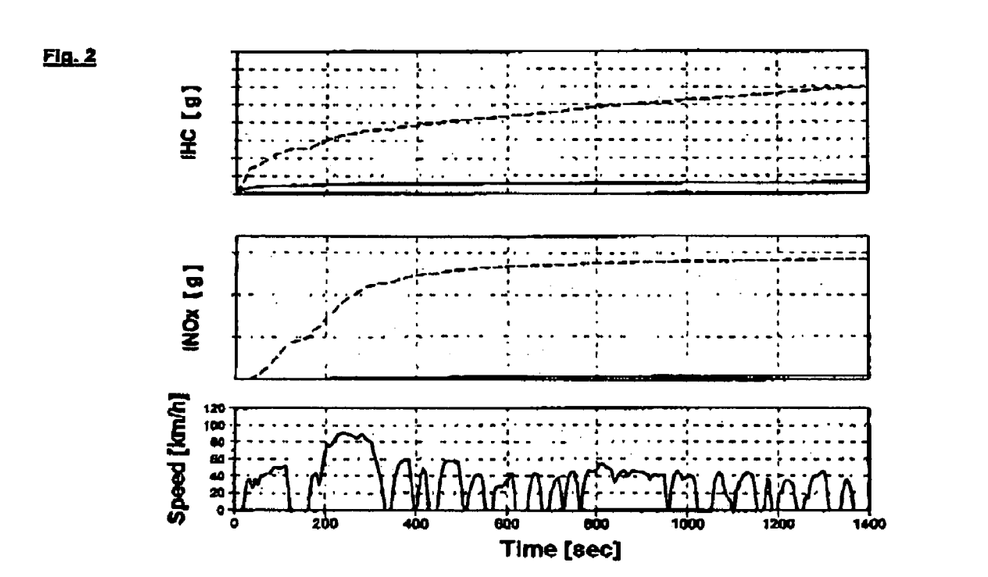
FIG. 2 illustrates a cumulative emission curve.

FIG. 2 shows a cumulative emission curve in the FTP72 test prescribed in the USA (which corresponds to the European NEDC test). In this case, a stabilized catalyst device which has been run in, i.e. in the new state in a motor vehicle after approx. 4000 km, is compared with a catalyst device which has been aged using the method according to the invention. The ageing of a catalyst device using the method according to the invention leads to a reduction in the activity with regard to HC, CO and NOx, as shown in FIG. 2. The lower diagram in FIG. 2 shows the speed curve in the FTP72 test, the speed being plotted in km/h against the time in sec. For this time speed profile, the upper diagram in FIG. 2 shows the cumulative hydrocarbon emissions in g plotted against time in sec, and the middle diagram shows the cumulative nitrogen oxide emissions in g plotted against time in sec, the emissions having been determined on the exit side of the catalyst device, specifically as a dashed line for the catalyst device which has been aged in accordance with the invention and as a solid line for the catalyst device which has been stabilized.

The modal presentation of the hydrocarbon emissions and nitrogen oxide emissions in accordance with FIG. 2 shows the distribution of the emissions in the form of a comparison between a stabilized catalyst device and a catalyst device which has been aged in accordance with the invention in the FTP72 test. It is possible firstly to recognize that the light-off temperature of the catalyst device which has been aged in accordance with the invention rises considerably compared to a stabilized catalyst device, and secondly that throughout the entire test both the cumulative hydrocarbon emissions and the cumulative nitrogen oxide emissions increase further, whereas the cumulative emissions in a stabilized catalyst device remain the same after an initial rise.

These characteristics are also directly reflected in the adjustment of the diagnosis of the catalyst conversion responsible therefor. In this diagnosis, the amplitude ratio of a post-cat sensor, a sensor located at the catalyst outlet for detecting the oxygen content of the gas which emerges there, as a measure of the oxygen storage capacity is compared with a model once per driving cycle. The model is matched to the OBD-relevant limit catalyst, and a limit value is determined from the amplitude ratio between the current signal of the post-cat sensor compared to the modeled post-cat sensor signal. In this case, the post-cat sensor signal is taken as a measure for the oxygen storage capacity of the catalyst device.

Figure 3:
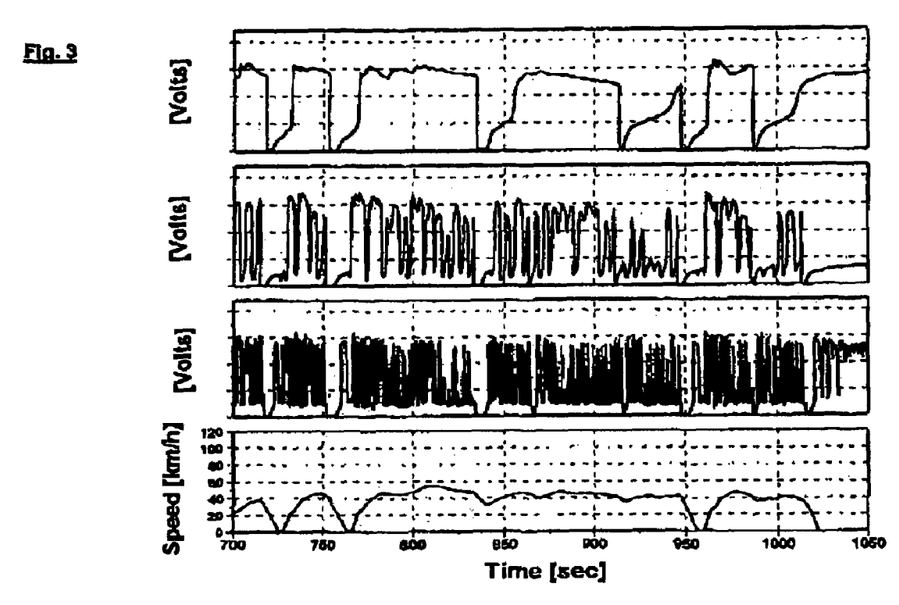
FIG. 3 illustrates a cumulative emission curve with more a spread out time axis as compared to the graph of FIG. 2

FIG. 3 shows—with a more spread-out time axis compared to FIG. 2—the post-cat sensor signal in volts plotted against time in sec, in the upper diagram for a stabilized catalyst device, in the middle diagram for a catalyst device which has been aged after prolonged running, i.e. a catalyst device which has been aged for 100 000 miles in a motor vehicle, and in the lower diagram for a catalyst device which has been aged in accordance with the invention. The sharpness of separation of the post-cat sensor signal between a catalyst device which has been aged after prolonged running and an (OBD) limit catalyst represents an important assessment criterion with regard to reliable catalyst monitoring in field operation. In this respect, it is noticeable from FIG. 3 that a catalyst device which has been aged in accordance with the invention emits a post-cat sensor signal which is constant throughout the exhaust-gas test, with the succession of signals being clearly pronounced and having a substantially constant amplitude. This performance simplifies the matching of the diagnosis, since the detection and diagnosis range can therefore be selected as desired in the exhaust-gas test. This is an important aspect with regard to the US legislature "CARB", which performs field monitoring on an ongoing basis and checks the diagnoses in the driving cycle of relevance to the customer.

Figure 4:
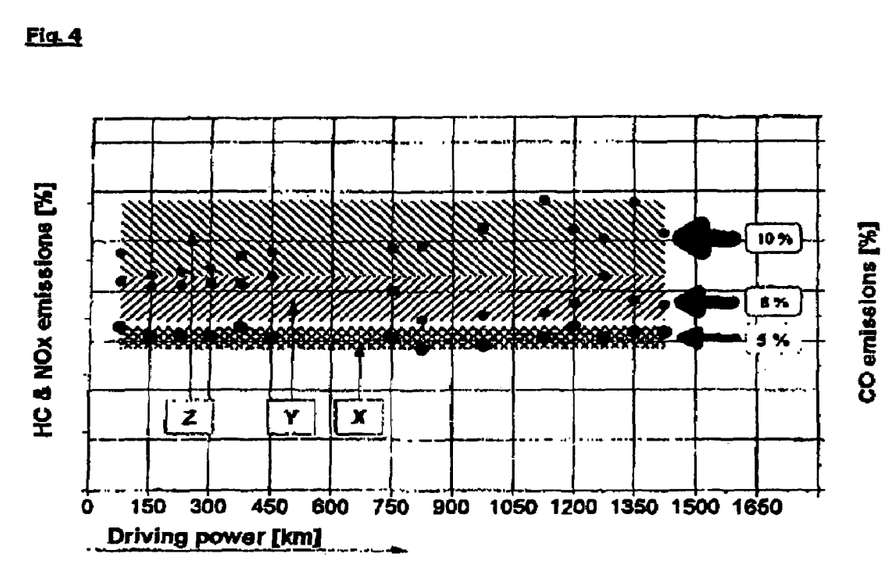
FIG. 4 illustrates a diagram showing the reproducibility of the emissions in percent over the driving power in km for a catalyst device which has been aged according to the invention.

FIG. 4 shows a diagram relating to the reproducibility of the emissions in % over the driving power in km for a catalyst device which has been aged in accordance with the invention, band X representing the scatter band for the hydrocarbon emissions, band Y representing the scatter band for the CO emissions and band Z representing the scatter band for the NOx emissions, in each case with corresponding measurement points, measured via the post-cat sensor signal. It can be seen from this that the scatter in the measured values is relatively low and the respective emissions are stable with respect to the driving power. The run-time stability obtained in this way is a further important assessment criterion for an aged catalyst device in order to obtain results which are reproducible during application.

The catalyst device which has been aged in accordance with the invention has a virtually constant performance throughout the run time illustrated of approx. 1400 km. For example, the hydrocarbon emissions fluctuate within a scatter band of approximately 5%, and the nitrogen oxide emissions fluctuate within a scatter band of approximately 10%. Therefore, the measured catalyst device has neither significantly improved nor deteriorated after the ageing.

Figure 5:
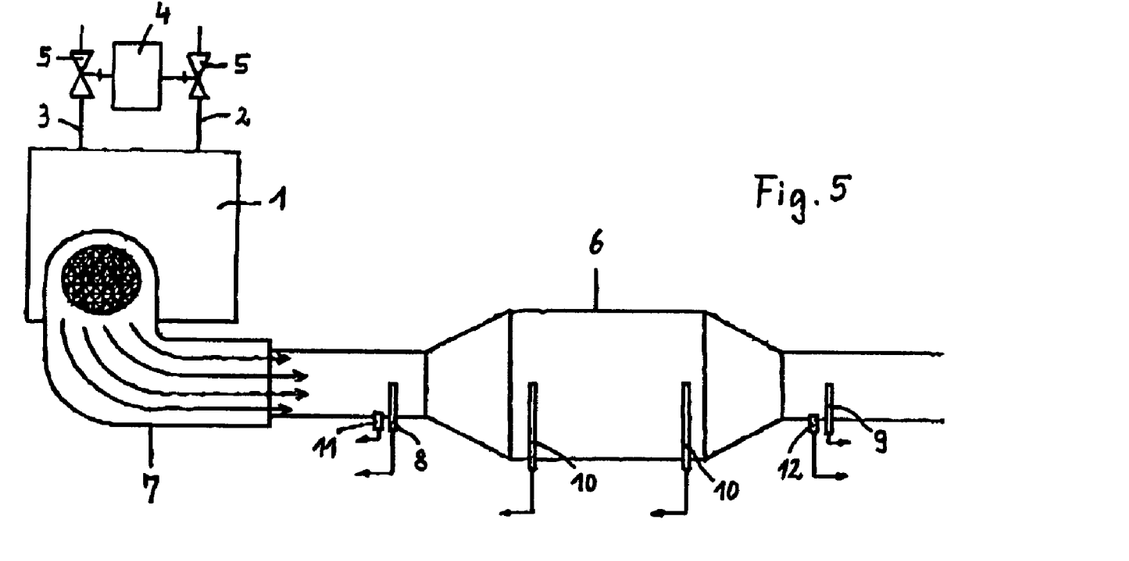
FIG. 5 diagrammatically depicts one embodiment of an apparatus for artificially ageing a catalyst device.

FIG. 5 diagrammatically depicts one embodiment of an apparatus for artificially ageing a catalyst device. This apparatus comprises a device 1 for generating a hot ageing gas, for example a burner (or a gas turbine) for a fuel consisting of hydrocarbons, this fuel being fed to the device 1 via a line 2. Furthermore, combustion air is fed to the device 1 via a further line 3, with a control unit 4 being provided so as to set the ratio of fuel to combustion air in accordance with a predetermined program by means of valves 5. The hot exhaust gas generated as ageing gas by the device 1 is in this case set, by means of the ratio of fuel to combustion air, in such a manner that a temperature of between approximately 1000° C. and approximately 1250° C. results at the entry to a catalyst device 6 that is to be aged. The ageing gas is in this case fed to the catalyst device 6 by means of a delivery device 7, for example a hot-air blower, which is responsible for a throughput of ageing gas through the catalyst device 6, for example corresponding to mixed fleet operation, and the temperature of the ageing gas at the entry to the catalyst device 6 is measured by means of a temperature sensor 8 and at the exit of the catalyst device 6 is measured by means of a further temperature sensor 9. Moreover, the temperature in the catalyst device 6 is measured upstream and downstream by means of two additional temperature sensors 10. Finally, the oxygen content of the ageing gas upstream and downstream of the catalyst device 6 is measured by means of two oxygen sensors 11, 12, the oxygen sensor 12 forming the post-cat sensor.

The optionally low-sulfur fuel which is to be burnt in the burner 1 is a fuel suitable for spark-ignition or diesel engines, depending on the catalyst device 6.

Figure 6:
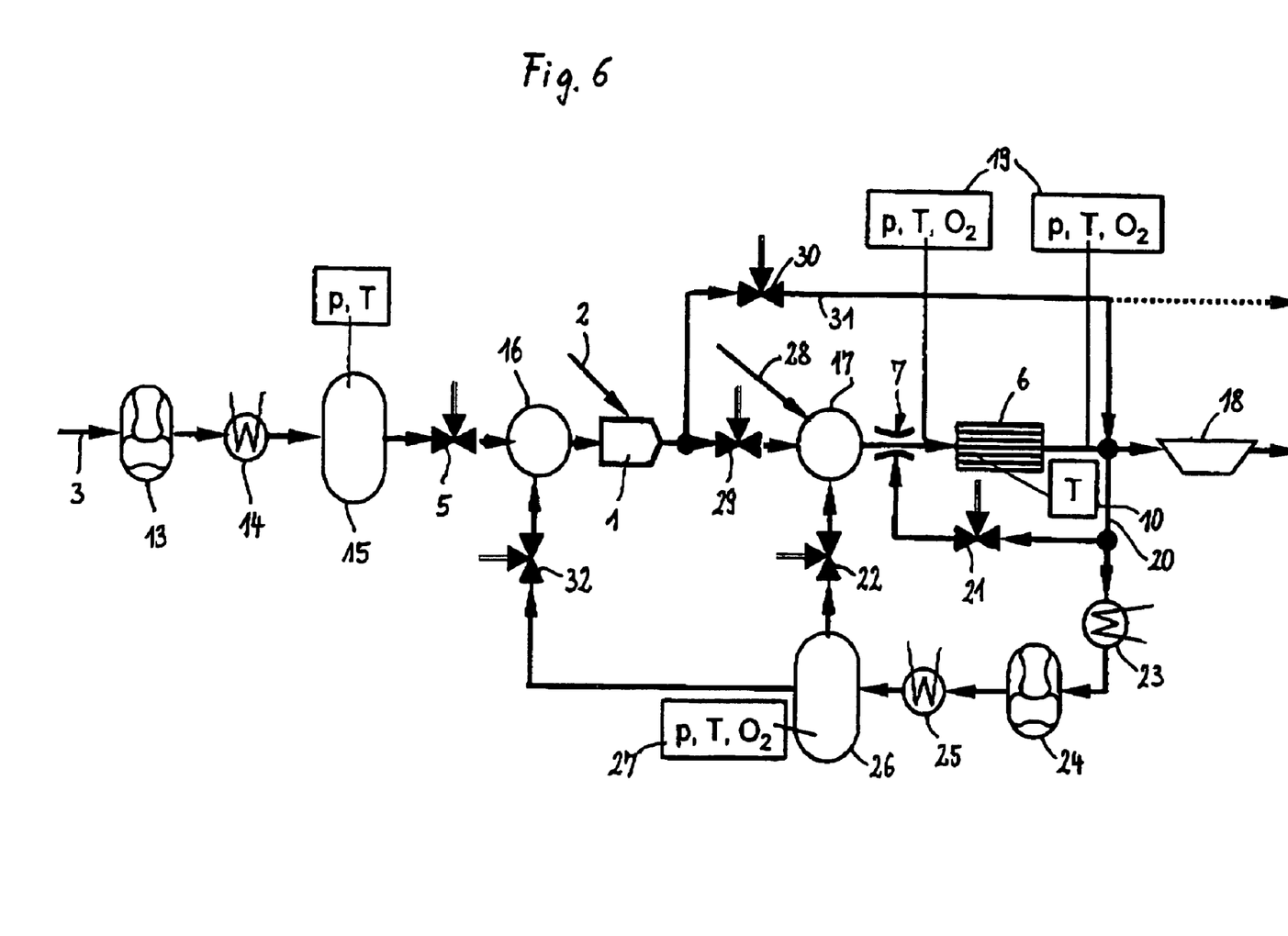
FIG. 6. diagrammatically depicts a further embodiment of an apparatus for artificially ageing a catalyst device.

FIG. 6 diagrammatically depicts a further embodiment of an apparatus for artificially ageing a catalyst device, specifically illustrating that combustion air is fed via the valve 5 to a mixer 16 (together with fuel via the line 2) via a line 3, a delivery device for this air, for example in the form of a pump 13, a heat exchanger 14 for combustion air, by means of which the temperature of the air, which is measured together with the pressure in the line 3 at a measuring location 15, can be set. The mixture of combustion air and fuel which is generated in the mixer 16 is fed to the device 1 for generating hot ageing gas, in this case in the form of a burner. Downstream of the device 1 there is a mixer 17 and the device 7 for delivering the hot ageing gas, which is delivered into the catalyst device 6 by the device 7. Downstream of the catalyst device 6 there is a turbine or throttle 18, from which the gas ultimately emerges.

A measuring location 19 for measuring the oxygen content, gas temperature and if appropriate gas pressure is provided both upstream and downstream of the catalyst device 6, and if appropriate the temperature can also be measured by means of suitable temperature sensors 10 in the catalyst device.

On the outlet side of the catalyst device 6 there is a branch for a line 20 for recirculating gas emerging from the catalyst device 6, which line 20 is connected, under the control of a throttle valve 21, to the device 8, if the latter is designed as a suction jet pump, in order to operate the latter.

As an alternative to being designed as a suction jet pump, the device 8 may, however, also be designed as a hot-gas blower, a flow compressor or as a rotary or reciprocating piston compressor.

However, as an alternative or in addition, the line 20 may also be connected via a throttle valve 22 to the mixer 17, in order in this way for gas from the outlet side of the catalyst device 6 to be admixed with the ageing gas stream. The gas which has been recirculated in this way may if appropriate be cooled by means of a heat exchanger 23 and then fed to the mixer 17 via a delivery device 24, for example a pump, and if appropriate via a further heat exchanger 25 for recooling the gas which has been compressed by the delivery device 24. Furthermore, a storage vessel 26 having a measuring location 27 for measuring the oxygen content, the gas temperature and the gas pressure may be incorporated.

It is also possible for additional substances which are to be mixed with the ageing gas to be fed to the mixer 17 via a line 28.

Upstream of the mixer 17 there may be a throttle valve 29, in which case a line 31 provided with a throttle valve 30 branches off between the device 2 and the throttle valve 29 in order to discharge excess ageing gas.

The reservoir 26 may also be connected via a throttle valve 32 to the line 2 and/or the mixer 16 in order to effect gas recirculation to the fuel/combustion air mix.

As can be seen, it is possible, with a simple structure in terms of apparatus, to produce ageing gases of various pressures, temperatures and qualities (air ratios), it being possible for the state variables to be set as a function of time or at constant levels by means of corresponding controllers (not shown). A temperature as is encountered in operation in engines of motor vehicles can be set by admixing cooled gas from the outlet of the catalyst device 6 to the ageing gas generated by the device 1.

To prevent overheating of the catalyst device 6 when starting up the apparatus for ageing, it is possible for the entire stream of ageing gas to be made to bypass the catalyst device via the line 31 when starting up. A partial quantity of this stream may also be returned, in cooled form, via the line 20 until the target values for air ratio and temperature have been reached.

To improve the dynamic performance, the adjustment range for throughput, pressure, temperature and air ratio of the ageing gas can be realized by admixing gas from the outlet side of the catalyst device 6 upstream and/or downstream of the device 1 (for example the burner), specifically in cooled or uncooled form. Compressing ageing gas and fresh air to an elevated pressure, for example double the original pressure, means that the mass flow through the various valves is independent of the back-pressure and is therefore a function only of the opening and density upstream of the valve. Dynamic control of mass flow, temperature and lambda, depending on the size of the storage volumes, may require additional measures, for example lambda measurement in the optionally stored gas which has been recirculated from the outlet side of the catalyst device 6, blowing-off of a partial stream of the ageing gas delivered by the device 1, or the admixing of cooled or uncooled gas.

Additives which reduce the temperature, for example on account of their heat of evaporation, or additives which chemically react with the catalyst material can be fed to the mixer 2 as additional substances. In particular the second option makes it possible to investigate selectively catalytically active exhaust-gas aftertreatment strategies, with synthetic, hot ageing gas with which, for example, nitrogen oxides are admixed being used if appropriate.

If a fuel is added as an additional substance, it is also possible to reach very high temperatures in the catalyst device 6 on account of the heat of reaction, with the result that it is possible to simulate the action of briefly increased levels of hydrocarbons in the exhaust gas from internal combustion engines.

The invention claimed is:

1. A method for artificially ageing a catalyst device for use on a catalyst test bench for converting exhaust gases comprising at least one constituent from the group consisting of C-, HC- and $NO_x$-containing constituents, in which method hot ageing gas which comprises at least one constituent from the group consisting of C-, HC- and $NO_x$-containing constituents is allowed for flow through the catalyst device, the hot ageing gas being passed through a catalyst device which is for use on a catalyst test bench and is suitable for the conversion of exhaust gases comprising C-, HC- and/or $NO_x$-containing constituents, characterized in that gas which emerges from the catalyst device is partially admixed with the ageing gas to be fed to the catalyst device, in order to be recirculated.

2. The method of claim 1, characterized in that the hot ageing gas used is an exhaust gas generated by combustion of a C-containing fuel.

3. The method as claimed in claim 2, characterized in that the hot exhaust gas is generated in a burner by combustion with combustion air.

4. The method as claimed in claim 2, characterized in that the hot exhaust gas is generated in a gas turbine.

5. The method as claimed in claim 1, characterized in that the hot ageing gas is passed through the catalyst device by means of a blower.

6. The method as claimed in claim 1, characterized in that the ageing gas is introduced into the catalyst device at a temperature of >250° C.

7. The method as claimed in claim 6, characterized in that the ageing gas is introduced into the catalyst device at a temperature of >700° C.

8. The method as claimed in claim 7, characterized in that the ageing gas is introduced into the catalyst device at a temperature of from approximately 1000° C. to approximately 1250° C.

9. The method as claimed in claim 3, characterized in that the hot exhaust gas is generated during combustion operation with lambda >1.

10. The method as claimed in claim 9, characterized in that the hot exhaust gas is generated during combustion operation with lambda >1.5.

11. The method as claimed in claim 2, characterized in that the fuel used is a combustible C-containing fluid selected from the group consisting of gaseous and liquid fluids.

12. The method as claimed in claim 11, characterized in that the fuel used is low sulfur fuel.

13. The method as claimed in claim 12, characterized in that a fuel with a sulfur content of $>\leqq 10$ ppm is used.

14. The method as claimed in claim 13, characterized in that a fuel with a sulfur content of $>\leqq 5$ ppm is used.

15. The method as claimed in claim 2, characterized in that the ratio of fuel to combustion air is varied in predetermined cycles.

16. The method as claimed in claim 15, characterized in that the catalyst device is subjected to different ageing gas compositions and ageing gas temperatures corresponding to a combined load cycle.

17. The method as claimed in claim 16, characterized in that the catalyst device is subjected to load corresponding to mixed vehicle operation.

18. The method as claimed in claim 1, characterized in that the catalyst device is subjected a number of times, in each case after an ageing step, to a diagnosis, in which the amplitude ratio of a post-cat sensor as a measure of the oxygen storage capacity is compared with a model, the model being matched to a relevant limit catalyst and a limit value being determined from the amplitude ratio between the current signal of the post-cat sensor compared to the modeled post-cat sensor signal, the post-cat sensor signal being taken as a measure of the oxygen storage capacity of the catalyst device.

19. The method as claimed in claim 1, characterized in that the ageing gas fed to the catalyst device is cooled.

20. The method as claimed in claim 19, characterized in that the ageing gas fed to the catalyst device is cooled by gas emerging from the catalyst device.

21. The method as claimed in claim 20, characterized in that gas emerging from the catalyst device is admixed in cooled form with the ageing gas that is to be fed to the catalyst device.

22. The method as claimed in claim 1, characterized in that the temperature of the ageing gas fed to the catalyst device is varied by cooling independently of the setting of lambda during generation of the ageing gas.

23. The method as claimed in claim 1, characterized in that at least one component is admixed to the hot ageing gas in order to set a defined composition of the ageing gas.

24. The method as claimed in claim 23, characterized in that at least one component selected from the group consisting of C- and HC-containing gas constituents is admixed.

25. The method as claimed in claim 1, characterized in that the ageing gas is generated synthetically.

26. The method as claimed in claim 1, characterized in that a catalyst device selected from the group consisting of a 3-way catalyst, an $NO_x$ catalyst, an oxidation catalyst, a reformer for reducing agent and a reformer for fuel cells is aged using the ageing gas.

27. An apparatus for artificially ageing a catalyst device for use on a catalyst test bench for converting exhaust gases comprising at least one constituent from the group consisting of C-, HC- and $NO_x$-containing constituents, in which a device for generating a hot ageing gas and a device for passing the host ageing gas through the catalyst device are provided, characterized in that a device for partial recirculation of gas emerging from the catalyst device to the ageing gas is provided.

28. The apparatus as claimed in claim 27, characterized in that the device for generating a hot ageing gas is a device for combustion of a C-containing fuel with combustion air.

29. The apparatus as claimed in claim 28, characterized in that the device for passing the hot ageing gas through the catalyst device is a hot-air blower.

30. The apparatus as claimed in claim 28, characterized in that the device for passing the hot ageing gas through the catalyst device is a suction jet pump.

31. The apparatus as claimed in claim 27, characterized in that a temperature sensor is provided for measuring the temperature of the ageing gas that is to be fed to the catalyst device.

32. The apparatus as calmed in claim 31, characterized in that a device for controlling the temperature of the ageing gas that is to be fed to the catalyst device is provided.

33. The apparatus as claimed in claim 27, characterized in that a device for cooling the ageing gas that is to be fed to the catalyst device is provided.

34. The apparatus as claimed in claim 33, characterized in that the device for cooling the ageing gas that is to be fed to the catalyst device comprises a device for cooling recirculated gas emerging from the catalyst device.

35. The apparatus as claimed in claim 27, characterized in that an oxygen sensor is provided at the outlet of the catalyst device for the purpose of monitoring the catalyst device.

36. The apparatus as claimed in claim 27, characterized in that an oxygen sensor is provided for the purpose of monitoring the ageing gas that is to be fed to the catalyst device.

* * * * *

UNITED STATES PATENT AND TRADEMARK OFFICE
CERTIFICATE OF CORRECTION

PATENT NO. : 7,131,320 B2
APPLICATION NO. : 10/520719
DATED : November 7, 2006
INVENTOR(S) : Rolf Weinowski et al.

It is certified that error appears in the above-identified patent and that said Letters Patent is hereby corrected as shown below:

Column 9, claim 13, line 60, delete "a sulfur" and insert --the sulfur--

Column 9, claim 13, line 60, delete "> $\leqq$" and insert -->--

Column 9, claim 14, line 60, delete "a sulfur" and insert -- the sulfur--

Column 9, claim 14, line 60, delete "> $\leqq$" and insert -->--

Column 10, claim 27, line 52, delete "a hot" and insert --the hot--

Column 11, claim 32, line 3, delete "clamed" and insert --claimed--

Signed and Sealed this

Tenth Day of April, 2007

JON W. DUDAS
*Director of the United States Patent and Trademark Office*